United States Patent
Xu et al.

(10) Patent No.: US 9,865,900 B2
(45) Date of Patent: Jan. 9, 2018

(54) SOLID ELECTROLYTE INTERPHASE FILM-SUPPRESSION ADDITIVES

(71) Applicant: BATTELLE MEMORIAL INSTITUTE, Richland, WA (US)

(72) Inventors: Wu Xu, Richland, WA (US); Hongfa Xiang, Hefei (CN); Jiguang Zhang, Richland, WA (US); Ruiguo Cao, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 14/595,065

(22) Filed: Jan. 12, 2015

(65) Prior Publication Data

US 2015/0125759 A1  May 7, 2015

Related U.S. Application Data (63) Continuation-in-part of application No. 13/495,745, filed on Jun. 13, 2012, which is a continuation-in-part
(Continued)

(51) Int. Cl.
*H01M 10/0567* (2010.01)
*H01M 10/0564* (2010.01)
(Continued)

(52) U.S. Cl.
CPC ..... *H01M 10/0567* (2013.01); *H01M 4/0445* (2013.01); *H01M 4/366* (2013.01);
(Continued)

(58) Field of Classification Search
CPC ......... H01M 10/0561; H01M 10/0564; H01M 10/0567; H01M 10/0569
See application file for complete search history.

(56) References Cited

U.S. PATENT DOCUMENTS

| | | | |
|---|---|---|---|
| 5,650,244 A | * | 7/1997 | Shoji ................. H01M 10/0567 429/337 |
| 5,780,182 A | | 7/1998 | Barker et al. |

(Continued)

FOREIGN PATENT DOCUMENTS

WO   WO 96/27908   *   9/1996

OTHER PUBLICATIONS

Takeuchi, et al., "Electrochemical Intercalation/De-Intercalation of Lithium Ions at Graphite Negative Electrode in TMP-Based Electrolyte Solution," *Journal of the Electrochemical Society*, 159 (12): A2089-A2091, Oct. 18, 2012.
(Continued)

*Primary Examiner* — Olatunji Godo
(74) *Attorney, Agent, or Firm* — Klarquist Sparkman, LLP (57) ABSTRACT

An energy storage device comprising:
 (A) an anode comprising graphite; and
 (B) an electrolyte composition comprising:
  (i) at least one carbonate solvent;
  (ii) an additive selected from $CsPF_6$, $RbPF_6$, $Sr(PF_6)_2$, $Ba(PF_6)_2$, or a mixture thereof; and
  (iii) a lithium salt.

31 Claims, 5 Drawing Sheets

Related U.S. Application Data of application No. 13/367,508, filed on Feb. 7, 2012, now abandoned, application No. 14/595,065, which is a continuation-in-part of application No. 13/495,727, filed on Jun. 13, 2012, now Pat. No. 8,980,460, which is a continuation-in-part of application No. 13/367,508.

(60) Provisional application No. 62/085,199, filed on Nov. 26, 2014.

(51) Int. Cl.

| | | |
|---|---|---|
| *H01M 10/0569* | (2010.01) | |
| *H01M 10/0525* | (2010.01) | |
| *H01M 10/0568* | (2010.01) | |
| *H01M 4/04* | (2006.01) | |
| *H01M 4/36* | (2006.01) | |
| *H01M 4/587* | (2010.01) | |

(52) U.S. Cl.
CPC ....... *H01M 4/587* (2013.01); *H01M 10/0525* (2013.01); *H01M 10/0568* (2013.01); *H01M 10/0569* (2013.01); *H01M 2300/0028* (2013.01); *H01M 2300/0037* (2013.01); *Y02T 10/7011* (2013.01)

(56) References Cited

U.S. PATENT DOCUMENTS

| 6,337,159 | B1* | 1/2002 | Peled | H01M 4/131 |
| | | | | 429/231.4 |
| 8,980,460 | B2 | 3/2015 | Zhang et al. | |
| 9,184,436 | B2 | 11/2015 | Xu et al. | |
| 2008/0206649 | A1* | 8/2008 | Kawashima | 429/324 |
| 2008/0286649 | A1* | 11/2008 | Li | H01M 10/0525 |
| | | | | 429/188 |
| 2009/0286155 | A1* | 11/2009 | Takehara | 429/199 |
| 2011/0111306 | A1* | 5/2011 | Park | H01M 10/0525 |
| | | | | 429/326 |
| 2011/0123871 | A1* | 5/2011 | Nakagawa | H01M 10/0525 |
| | | | | 429/326 |
| 2013/0199936 | A1 | 8/2013 | Zhang et al. | |
| 2013/0202956 | A1 | 8/2013 | Zhang et al. | |
| 2014/0178770 | A1 | 6/2014 | Xu et al. | |

OTHER PUBLICATIONS

Komaba, et al., "Enhancement of Li-ion battery perfoiivance of graphite anode by sodium ion as an electrolyte additive," *Electrochemistry Communications*, 5: 962966, Oct. 8, 2003.

Komaba, et al., "Electrochemistry of Graphite in Li and Na Salt Codissolving Electrolyte for Rechargeable Batteries," *Journal of the Electrochemical Society*, 154 (4): A322-A330. Feb. 16, 2007.

Komaba, et al., "Opposite influences of K+ versus Na+ ions as electrolyte additives on graphite electrode performance," *Journal of Power Sources*, 146: 166-170, May 31, 2005.

Zheng, et al., "Potassium Salts: Electrolyte Additives for Enhancing Electrochemical Perfoiniances of Natural Graphite Anodes," *Electrochemical and Solid-State Letters*, 9 (3): A115-A119, Jan. 12, 2006.

Wu, et al., "Effect of Sodium Chloride as Electrolyte Additive on the Performance of Mesocarbon Microbeads Electrode," *International Journal of Electrochemical Science*, 8: 670-677, Jan. 1, 2013.

Ding et al., "Dendrite-Free Lithium Deposition via Self-Healing Electrostatic Shield Mechanism," *Journal of the American Chemical Society*, vol. 135, pp. 4450-4456, Feb. 28, 2013.

Xiang et al., "The Role of Cesium Cation in Controlling Interphasial Chemistry on Graphite Anode in Propylene Carbonate-Rich Electrolytes," *Applied Materials & Interfaces*, vol. 7, pp. 20687-20695, Sep. 10, 2015.

Xiang et al., "The Role of Cesium Cation in Controlling Interphasial Chemistry on Graphite Anode in Propylene of Carbonate-Rich Electrolytes—Supporting Information," *Applied Materials & Interfaces*, vol. 7, pp. S1-S19, Sep. 10, 2015.

Zheng et al., "Effects of Propylene Carbonate Content in CsPF6-Containing Electrolytes on the Enhanced Performances of Graphite Electrode for Lithium-Ion Batteries—Supporting Information," *Applied Materials & Interfaces*, vol. 8, pp. 5715-5722, Feb. 10, 2016.

Zheng et al., "Effects of Propylene Carbonate Content in CsPF6-Containing Electrolytes on the Enhanced Performances of Graphite Electrode for Lithium-Ion Batteries," *Applied Materials & Interfaces*, vol. 8, pp. 5715-5722, Feb. 10, 2016.

\* cited by examiner

SOLID ELECTROLYTE INTERPHASE FILM-SUPPRESSION ADDITIVES

CROSS REFERENCE TO RELATED APPLICATIONS

This application claims the benefit of U.S. Provisional Application 62/085,199, filed Nov. 26, 2014, which is incorporated herein by reference. This application is a continuation-in-part of U.S. application Ser. No. 13/495,727, filed Jun. 13, 2012, which is a continuation in part of U.S. application Ser. No. 13/367,508, filed Feb. 7, 2012, both of which applications are incorporated herein by reference. This application is a continuation-in-part of U.S. application Ser. No. 13/495,745, filed Jun. 13, 2012, which is a continuation in part of U.S. application Ser. No. 13/367,508, filed Feb. 7, 2012, both of which applications are incorporated herein by reference.

BACKGROUND

Lithium-ion batteries (LIBs) have been developed as a promising power source for electric vehicles because of their high energy density and long lifetime. Graphite is widely used as an anode electrode material in the state-of-the-art LIBs. However, a graphite anode is usually only compatible with an ethylene carbonate (EC)-based electrolyte. When contacting with a propylene carbonate (PC)-based electrolyte, which is advantageous over the EC-based one because PC has a wider operating temperature range and higher low-temperature conductivity, the graphite anode may suffer from a substantial exfoliation problem during the initial lithium intercalation step.

Consequently, a PC-based electrolyte cannot be used in LIBs with graphite as the anode unless solid electrolyte interphase (SEI) film-formation additives are introduced into the electrolyte compositions in certain amounts. The SEI film-formation additives are usually reduced predominantly on the graphite electrode surfaces before PC is reduced. These additives mainly include some functional groups such as vinylene or cyclic unsaturated group. For example, vinylene carbonate (VC), vinyl ethylene carbonate (VEC) and fluoroethylene carbonate (FEC) have been widely studied and used as SEI film-formation additives for PC-based electrolyte compositions. They play an important role in the protection of the structure of the graphitic anode from destruction by PC. In addition, for some functional electrolyte systems, e.g., flame-retarded electrolytes or ionic liquid-based electrolytes, SEI film-formation additives also are needed. However, these additives tend to build up a thick SEI protective layer, which could significantly reduce the rate capability, low-temperature performance and cycling stability at elevated temperatures because of the high additional impedance and poor thermal stability from the SEI film.

SUMMARY

Disclosed herein is an energy storage device comprising:
(A) an anode comprising graphite; and
(B) an electrolyte composition comprising:
(i) at least one carbonate solvent;
(ii) an additive selected from $CsPF_6$, $RbPF_6$, $Sr(PF_6)_2$, $Ba(PF_6)_2$, or a mixture or combination thereof; and
(iii) a lithium salt.

Also disclosed herein is an energy storage device comprising:
(A) an anode comprising graphite; and
(B) an electrolyte composition comprising:
(i) at least 5 weight % propylene carbonate, based on the total amount of the electrolyte composition;
(ii) an additive selected from $CsPF_6$, $RbPF_6$, $Sr(PF_6)_2$, $Ba(PF_6)_2$, or a mixture or combination thereof; and
(iii) a lithium salt.

Further disclosed herein is an energy storage device comprising:
(A) an anode comprising graphite; and
(B) an electrolyte composition comprising:
(i) propylene carbonate and ethylene carbonate;
(ii) an additive selected from $CsPF_6$, $RbPF_6$, $Sr(PF_6)_2$, $Ba(PF_6)_2$, or a mixture or combination thereof; and
(iii) a lithium salt.

Additionally disclosed herein is an energy storage device comprising:
(A) an anode comprising graphite; and
(B) an electrolyte composition comprising:
(i) propylene carbonate;
(ii) an additive comprising a metal (M) salt that contains a M+ cation, wherein the M+ cation has a stronger solvation ability with ethylene carbonate compared to polyethylene carbonate; and
(iii) a lithium salt.

The foregoing will become more apparent from the following detailed description, which proceeds with reference to the accompanying figures.

DETAILED DESCRIPTION

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought as known by those persons of ordinary skill in the art or limits of detection under standard test conditions/methods, as known to those persons of ordinary skill in the art. When directly and explicitly distinguishing embodiments from discussed prior art, the embodiment numbers are not approximates unless the word "about" is recited.

To facilitate review of the various embodiments of the disclosure, the following explanations of specific terms are provided:

Anode: An electrode in an electrochemical cell through which the electric charge flows into a polarized electrical device leading the anode active material or more precisely the anode active element in the anode to a higher valence. At the same time, negatively-charged anions move toward the anode and/or positively-charged cations move away from it to balance the electrons arriving from external circuitry. In a discharging battery, such as the disclosed lithium-ion battery or a galvanic cell, the anode is the negative terminal where electrons flow out. If the anode is composed of a metal, electrons that it gives up to the external circuit are accompanied by the formation of metal cations and their moving away from the electrode and into the electrolyte.

Anode active material: A material that is included in an anode and produces the electrons that flow out of the anode in a discharging battery.

Cell: As used herein, a cell refers to an electrochemical device used for generating a voltage or current from an electrochemical reaction, or the reverse in which an electrochemical reaction is induced by a current. Examples include voltaic cells, electrolytic cells, redox flow cells, and fuel cells, among others. A battery includes one or more cells. The terms "cell" and "battery" are used interchangeably only when referring to a battery containing a single cell.

Coin cell: A small, typically circular-shaped, or button-like, battery. Coin cells are characterized by their diameter and thickness. For example, a type 2325 coin cell has a diameter of 23 mm and a height of 2.5 mm.

Intercalation: A term referring to the insertion of a material (e.g., an ion, molecule, or group) between the atoms, molecules, or groups of another material. For example, lithium ions can insert, or intercalate, into graphite (C) to form lithiated graphite ($LiC_6$).

Specific capacity: A term that refers to capacity per unit of mass. Specific capacity may be expressed in units of mAh/g, and often is expressed as mAh/g carbon when referring to a carbon-based electrode.

Batteries, such as LIBs, typically comprise three components: an anode, and electrolyte and a cathode. The anode and the cathode participate in electrochemical reactions to produce energy. LIBs produce energy through electrochemical reactions occurring between the anode and cathode. Typically both the anode and cathode are made of materials into which, and from which, lithium ions can intercalate and de-intercalate. During battery discharge, lithium ions de-intercalate from the anode material and migrate through the electrolyte to the cathode into which they insert. During a charging process, the opposite reaction occurs, i.e., lithium ions are extracted from the cathode material and migrate through the electrolyte back to the anode where they reinsert.

In a conventional LIB based on graphite|$LiCoO_2$, charging occurs when lithium ions migrate from the cathode to the anode, as shown in the representative forward reactions below:

cathode half reaction: $LiCoO_2 \leftrightarrow Li_{1-x}CoO_2 + x Li^+ + xe^-$ anode half reaction: $xLi^+ + xe^- + 6C \leftrightarrow Li_xC_6$ Discharging occurs when the reactions run in reverse.

Graphite anodes in LIBs are susceptible to exfoliation based on the electrolytes used. Conventionally, appropriate compounds such as EC have to be used in the electrolyte composition in LIB systems to form a stable SEI film on the graphite anode surface, which only allows the insertion or deintercalation of $Li^+$. Otherwise, the compounds coordinated with $Li^+$ will co-intercalate into graphite layers of the anode and "exfoliate" the graphite structure leading to quick degradation and not allowing significant (greater than 50 cycles) battery or capacitor cycling without significant loss in specific capacity such that the device is not useful and/or economically useful as an energy storage device or system.

However, almost all SEI layers are unstable and accompanied by the continuous consumption of the electrolyte component, such as widely used with organic carbonate solvent-based electrolytes and thus accumulation of cell impedance, which largely limits the long-term operation of the whole battery system.

We disclose herein that certain additives can suppress the reductive decomposition of PC and other organic carbonate solvents on the graphite anode without building a thick and resistant SEI film but at the same time protect the graphite anode from exfoliation in PC-based electrolytes. These additives provide a novel protective mechanism for the graphite anode in the PC-containing electrolyte without or suppressed SEI film formation. The SEI film-suppression additives not only significantly improve the compatibility between graphite anode and PC-containing electrolyte compositions, but also exhibit superior rate capability and excellent cycling stability at elevated temperatures or even at low temperatures. The electrolyte additive(s) disclosed herein can be applied to LIBs and other electrochemical systems using PC-containing electrolyte compositions and a graphite anode.

Advanced LIBs with high energy density and high power density are urgently demanded for electrical vehicles. PC-based electrolytes could enable wide-temperature-range (−40~+60° C.) application of LIBs. Even in the common EC-based electrolyte systems, film-formation additives are widely used to improve cell performances in the battery industry. The novel systems and compositions disclosed herein provide a more effective surface chemistry on graphite anode than the commonly used SEI film formation additives. The additives disclosed herein can effectively build up an ultrathin but compact and stable SEI layer on graphite anode, therefore significantly improving the rate capability and cycling stability at elevated temperatures (such as up to +60° C.). Simultaneously, due to the significantly reduced SEI layer and the impedance, the low-temperature performance of LIBs using such additives will be improved (such as down to −40° C.). Although the conventional SEI film-formation additive can form a thick SEI layer on the graphite surface by sacrificial reduction to protect the graphite anode from exfoliation, such an SEI layer usually increases the interfacial impedance especially at low temperatures and also has poor stability under thermal or high current density conditions. However, the SEI layer built by the additive(s) disclosed herein is so thin and compact that the graphite exfoliation in a PC-containing electrolyte composition may be effectively suppressed and also exhibit enhanced rate capability (up to 5C or even 10C rate), cycling stability (for more than 1000 cycles) and low temperature performance (down to −40° C.).

Electrolyte additives that can effectively reduce the SEI film formation and enhance the compatibility between graphite anode and non-aqueous electrolytes, especially for (PC)-containing electrolyte compositions are provided.

In certain embodiments, the additive is a metal (M) salt that contains $M^+$ cations. The $M^+$ cations have a stronger coordinating ability with EC compared to PC and other solvents, which preferentially results in the formation of a thin and stable SEI layer on the graphite prior to PC reductive decomposition. Thus, graphite electrochemical exfoliation in the PC-containing electrolyte compositions can be suppressed effectively. Compared to the commonly used SEI film-formation additives, such as fluoroethylene carbonate (FEC), the additives disclosed herein suppress the SEI film formation so as to build up an ultrathin or even a non-continuous SEI layer. The thickness of the ultrathin film is less than 3 nm, but that formed by the commonly used SEI film-formation additives is thicker than 3 nm. Additionally, there are some particles with the size of 30-50 nm embedded in the SEI layer built by FEC. Thus, the LIBs using the SEI film-suppression additives exhibit better rate capability and cycling stability at an elevated temperature and even lower temperature than those using the common film-formation additives.

As used herein, cations, in the context of the metal (M) salt refer to atoms or molecules having a net positive electrical charge. In but one example, the total number of electrons in the atom or molecule can be less than the total number of protons, giving the atom or molecule a net positive electrical charge. Cations are not limited to the +1 oxidation state in any particular instance. In some descriptions herein, a cation can be generally represented as $X^+$, which refers generally to any oxidation state, not just +1.

Examples of cations for the SEI film-suppression additive include, but are not limited to, $Cs^+$, $Rb^+$, $Sr^{2+}$, and $Ba^{2+}$.

The SEI film-suppression additive can comprise an anion that includes, but is not limited to, $PF_6^-$, $BF_4^-$, $AsF_6^-$, $N(SO_2CF_3)_2^-$, $N(SO_2F)_2^-$, $CF_3SO_3^-$, $ClO_4^-$, bis(oxalato) borate ($BOB^-$), difluoro oxalato borate ($DFOB^-$), $I^-$, $Cl^-$, $NO_3^-$, $SO_4^{2-}$ and combinations thereof. Preferably, the anion comprises $PF_6^-$.

Any combination of the above-described cations and anions may be employed for the SEI film-suppression additive. In certain embodiments, the SEI film-suppression additive is cesium hexafluorophosphate ($CsPF_6$), rubidium hexafluorophosphate ($RbPF_6$), strontium hexafluorophosphate ($Sr(PF_6)_2$), or barium hexafluorophosphate ($Ba(PF_6)_2$).

In certain embodiments, the cations of the SEI film-suppression additive are not chemically or electrochemically reactive with respect to the Li cations of the lithium salt. Accordingly, the SEI film-suppression additive is not necessarily consumed during electrodeposition or during operation of an energy storage device.

The electrolyte composition also includes at least one organic carbonate solvent. In certain embodiments, the solvent is propylene carbonate (PC). In certain embodiments, the solvent is ethylene carbonate (EC). Other carbonate solvents include dimethyl carbonate (DMC), ethyl methyl carbonate (EMC), and diethyl carbonate (DEC). Optional co-solvents include methyl butyrate (MB), ethyl propionate (EP), trimethyl phosphate (TMPa), triethyl phosphate (TEPa), tris(2,2,2-trifluoroethyl)phosphate (TTFEPa), tributyl phosphate (TBPa), trimethyl phosphite (TMPi), triethyl phosphite (TEPi), tris(2,2,2-trifluoroethyl)phosphite (TTFEPi), triphenyl phosphite (TPPi), dimethyl methylphosphate (DMMP), or a mixture or combination thereof. The additional co-solvents may be used for overcharge protection or flame-retarding purposes. In certain embodiments, the only solvent present in the electrolyte composition is propylene carbonate. In certain embodiments, the solvent comprises, or consists of, propylene carbonate and ethylene carbonate. In certain embodiments, the electrolyte composition includes at least 5 weight %, more particularly at least 8 weight %, PC, based on the total amount of all the components of the electrolyte composition. In certain embodiments, the electrolyte composition includes 0 to 50 weight %, more particularly at least 0 to 5 weight %, PC, based on the total amount of all the components of the electrolyte composition. In certain embodiments, the electrolyte composition includes 5 to 50 weight %, more particularly 8 to 20 weight %, PC, and 5 to 60 weight %, more particularly 15 to 40 weight %, EC based on the total amount of all the components of the electrolyte composition.

The electrolyte composition further includes a Li salt. Illustrative examples include $LiPF_6$, $LiBF_4$, $LiClO_4$, $LiAsF_6$, $LiSbF_6$, $LiCF_3SO_3$, $LiN(SO_2F)_2$, $LiN(SO_2CF_3)_2$, $LiN(SO_2C_2F_5)_2$, $LiN(SO_2CF_3)(SO_2C_4F_9)$, $LiC(SO_2CF_3)_3$, $LiPF_3(C_3F_7)_3$, $LiB(CF_3)_4$, $LiBF_3(C_2F_5)$, LiBOB, LiDFOB, or a mixture thereof. Lithium hexafluorophosphate ($LiPF_6$) is preferred.

In certain embodiments, the SEI film-suppression additive is present in an amount of 0.001 to 0.2 mole/liter, and the Li salt is present in an amount of 0.5 to 3.5 mole/liter. In certain embodiments, the electrolyte composition does not include 4,5-dichloroethylene carbonate, vinyl ethylene carbonate (VEC), vinylene carbonate (VC), or fluoroethylene carbonate (FEC).

The new approach with the novel mechanism to improve the compatibility between graphite anode and PC-containing electrolyte is explained in more detail. In the electrolyte system disclosed herein, an additive metal (M) salt is included in the PC-containing electrolyte composition which also includes a main Li salt and a solvent that includes PC, and optionally at least one co-solvent such as EC or other co-solvents such as such as DMC, DEC and EMC. The $M^+$ cation has a lower solvation number with solvents compared to $Li^+$, so that the $M^+$-solvate molecular has the fast transport ability because of its small size. At the same time, the intercalation and reduction potentials of $Li^+$-$(PC)_n$ ($2 \leq n \leq 5$) solvate is quite close to those of Li$^+$-(EC)$_m$ ($2 \leq m \leq 5$) solvate, but M$^+$-(EC)$_a$ ($1 \leq a \leq 4$) has obvious priority to M$^+$-(PC)$_b$ ($1 \leq b \leq 4$) for the intercalation and reduction. The subscripts m, n, a, and b represent the number of solvent molecules coordinated with the Li$^+$ or M$^+$ in the related solvates. As a result, a high-quality SEI layer built by EC, ultrathin but compact, can effectively suppress the PC co-intercalation and reduction on the graphite anode.

In certain embodiments, the composition of the ultrathin SEI layer is mainly Li$_2$CO$_3$ and lithium alkyl carbonates.

In certain embodiments, the concentration of SEI film-suppression additive cations is less than, or equal to, 20 weight % of that of the Li cations of the Li salt. In another, the concentration of SEI film-suppression additive cations is less than, or equal to, 10 weight % of that of the Li cations of the Li salt. In another, the concentration of SEI film-suppression additive cations is less than, or equal to, 5 weight % of that of the Li cations of the Li salt. In yet another, the concentration of SEI film-suppression additive cations is less than, or equal to, 2 weight % of that of the Li cations of the Li salt.

In particular embodiments, the graphite anode comprises, consists essentially of, or consists of, a graphite-material based anode, such as a pure or substantially pure graphite material anode or a graphite composite-based anode, such as a mixture of graphite, carbon conductors such as carbon black, carbon nanotubes, carbon nanofiber, graphene, or reduced graphene oxide and a binder such as polyvinylidene fluoride (PVDF), carboxymethyl cellulose (CMC), styrene-butadiene rubber (SBR), polyacrylic acid (PAA), or Li-polyacrylic acid (Li-PAA), or a mixture of the binders. The carbon conductor and binder are used to prepare the anode but do not contribute to the capacity of the graphite anode and as such may be considered along with other common additives as components described by the language "consisting essentially of." Other graphite-based anode composite materials may be used, such as graphite/Li, graphite/SiO$_x$, graphite/Si, graphite/Sn, graphite/MO$_x$, (M: Ti, V, Cr, Fe, Co, Ni, Cu, Zn, Ge, and Sn), graphite/Li$_x$M$_y$O$_z$ (M=Ti, and others). For ease of discussion, certain embodiments are disclosed using the language "graphite anode" but should be understood to include the graphite-mixed anode materials noted above unless the terms "pure graphite" or "substantially pure graphite" are used. A "pure graphite" anode refers to those made essentially exclusively or exclusively of graphite, to the ability for conventional means to produce the same, but does not include the graphite-mixed anode materials alternatives noted above or other conventional materials added to graphite anodes.

In certain embodiments, the cathode comprises a lithium intercalation compound. Examples can include, but are not limited to, Li$_{4-x}$M$_x$Ti$_5$O$_{12}$ (M=Mg, Al, Ba, Sr, or Ta; $0 \leq x \leq 1$), MnO$_2$, V$_2$O$_5$, LiV$_3$O$_8$, LiM$^{C1}_x$M$^{C2}_{1-x}$PO$_4$ (M$^{C1}$ or M$^{C2}$=Fe, Mn, Ni, Co, Cr, or Ti; $0 \leq x \leq 1$), Li$_3$V$_{2-x}$Mx(PO$_4$)$_3$ (M=Cr, Co, Fe, Mg, Y, Ti, Nb, or Ce; $0 \leq x \leq 1$), LiVPO$_4$F, LiM$^{C1}_x$M$^{C2}_{1-x}$O$_2$ (M$^{C1}$ or M$^{C2}$=Fe, Mn, Ni, Co, Cr, Ti, Mg, Al; $0 \leq x \leq 1$), LiM$^{C1}_x$M$^{C2}_y$M$^{C3}_{1-x-y}$O$_2$ (M$^{C1}$, M$^{C2}$, or M$^{C3}$=Fe, Mn, Ni, Co, Cr, Ti, Mg, or Al; $0 \leq x \leq 1$; $0 \leq y \leq 1$), LiMn$_{2-y}$X$_y$O$_4$ (X=Cr, Al, or Fe, $0 \leq y \leq 1$), LiNi$_{0.5-y}$X$_y$Mn$_{1.5}$O$_4$ (X=Fe, Cr, Zn, Al, Mg, Ga, V, or Cu; $0 \leq y \leq 0.5$), xLi$_2$MnO$_3$·(1-x)LiM$^{C1}_y$M$^{C2}_z$M$^{C3}_{1-y-z}$O$_2$ (M$^{C1}$, M$^{C2}$, or M$^{C3}$ =M$_n$, Ni, Co, Cr, Fe, or mixture of; x=0.3-0.5; y$\leq$0.5; z$\leq$0.5), Li$_2$MSiO$_4$ (M=Mn, Fe, or Co), Li$_2$MSO$_4$ (M=Mn, Fe, or Co), LiMSO$_4$F (Fe, Mn, or Co), Li$_{2-x}$(Fe$_{1-y}$Mn$_y$)P$_2$O$_7$ ($0 \leq y \leq 1$). In certain embodiments, the cathode comprises LiMn$_2$O$_4$, LiFePO$_4$, LiCoO$_2$, LiNi$_{0.8}$Co$_{0.15}$Al$_{0.05}$O$_2$, LiNi$_{1/3}$Mn$_{1/3}$Co$_{1/3}$O$_2$, LiNi$_{0.5}$Mn$_{1.5}$O$_4$, xLi$_2$MnO$_3$·(1-x)LiNi$_{1/3}$Mn$_{1/3}$Co$_{1/3}$O$_2$, LiCoPO$_4$, or Li$_2$MSiO$_4$ (M=Fe, Mn, or Co).

Unlike the conventional SEI formation additives that could reduce the rate capability because of increased impedance, M$^+$ cations of the additive salt disclosed herein will significantly enhance the film-formation ability of EC, even in a quite low content of EC in the electrolyte composition (e.g. 0.05 mole/liter). The salt additives can effectively build up an ultrathin but stable SEI layer on the graphite anode, therefore having advantages in improving the rate capability and cycling stability at elevated temperatures over the commonly used SEI film-formation additives.

In certain embodiments, the additive disclosed herein suppresses graphite exfoliation without altering the bulk graphite.

EXAMPLES

LiPF$_6$, CsPF$_6$, PC, EC and EMC were acquired commercially in battery grade. Electrolytes were prepared inside a glove box filled with purified argon, where the moisture and oxygen content was less than 1 ppm. An electrolyte (B-Cs) comprising 0.05 mole/liter CsPF$_6$ (as the SEI film suppression additive) and 1.0 mole/liter LiPF$_6$ in a solvent mixture of EC-PC-EMC (5:2:3, wt.) was prepared and used to conduct electrochemical tests. The electrolyte of 1.0 mole/liter LiPF$_6$/EC-PC-EMC (5:2:3, wt.) (Baseline) and the baseline electrolyte with 2 wt. % FEC (B-FEC) were also prepared and tested under the same conditions for comparison.

A graphite electrode consisting of 92 wt. % MAG10 graphite particles (Hitachi Powdered Metals Co. Ltd.) and 8 wt. % poly(vinylidene fluoride) (PVDF) and a positive electrode consisting of 84 wt. % LiNi$_{0.8}$Co$_{0.15}$Al$_{0.05}$O$_2$ (NCA), 4 wt. % SFG-6, 4 wt. % Super P and 8 wt. % PVDF were made on copper foil and aluminum foil, respectively. The mass loading of MAG10 and NCA in the above composite electrodes was controlled at about 5 mg/cm$^2$ and 10 mg/cm$^2$, respectively.

CR2032-type coin cells were assembled in the glove box and then tested on an Arbin BT-2000 battery tester at room temperature or at 60° C. in an environmental chamber (SPX Thermal Product Solutions, USA). The Li|graphite half-cells were galvanostatically cycled between 0.005 and 1.2 V at a current rate of C/3 (where 1C=2.4 mA/cm$^2$ for charging (Li intercalation) and 1C for discharging (Li de-intercalation) at room temperature. The graphite|NCA full-cells were cycled between 2.5 and 4.3 V at C/3 for charge and 1C for discharge at room temperature or at C/2 for charge-discharge at 60° C. For the rate testing, the full-cells were charged at C/5 and discharged at different rates. Before all the tests of both the half-cells and full-cells, two formation cycles were conducted in advance at a C/20 rate. For surface analysis, the graphite electrodes were obtained from the half-cells or full-cells after cell disassembly, and washed thoroughly with DMC for three times to thoroughly remove residual electrolytes and evacuated to remove DMC. Then the surface morphologies of the graphite electrodes were analyzed by scanning electron microscopy (SEM, JEOL 5900) and high resolution transmission electron microscopy (HRTEM, JEOL 2010).

Figure 1:
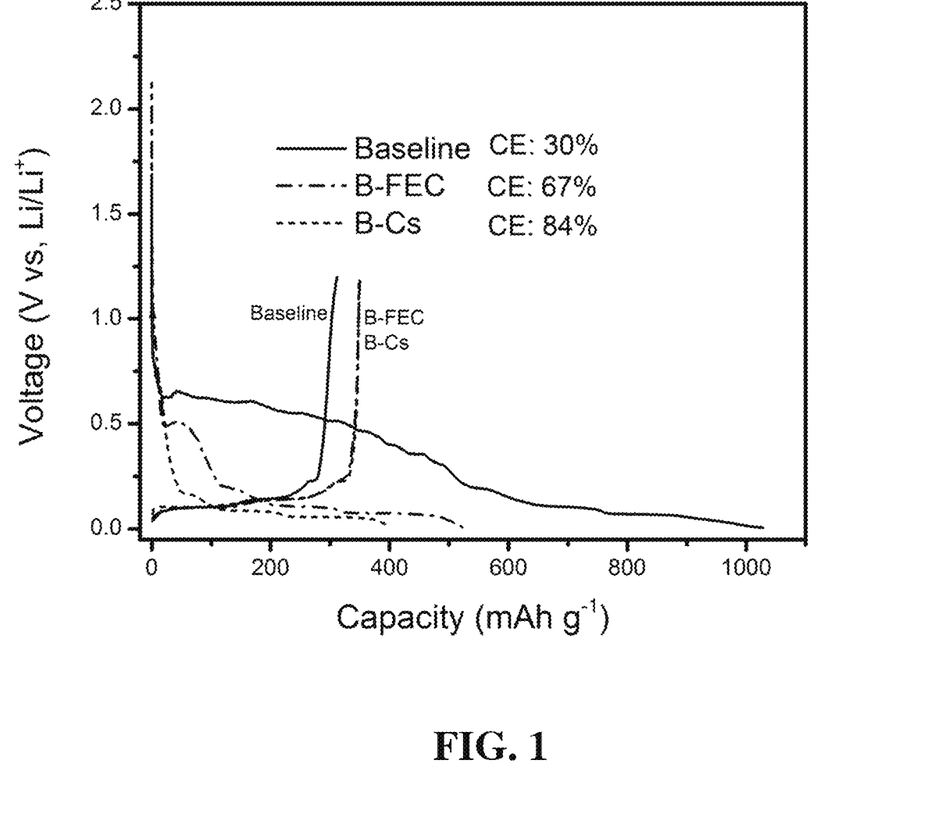
FIG. 1 depicts initial voltage profiles of the Li|graphite half-cells with various electrolytes where baseline=1.0 mole/liter $LiPF_6$ in EC+PC+EMC (5:2:3, wt.), B-FEC=baseline+2 wt. % FEC and B-Cs=baseline+0.05 mole/liter LiCsPF6 additive.

FIG. 1 compares the initial voltage profiles of the Li|graphite half-cells with various electrolytes. For the baseline electrolyte, the plateau at above 0.5 V clearly indicates that serious PC reduction decomposition and graphite exfoliation happen. After 2 wt. % FEC is introduced (B-FEC), this plateau is significantly suppressed, but not completely. However, the addition of 0.05M $CsPF_6$ into the baseline electrolyte (B-Cs) can completely inhibit the PC reduction and graphite exfoliation. Moreover, the Coulombic efficiency (CE) of the cell using B-Cs is much higher than those using other two electrolytes (84% for B-Cs, 67% for B-FEC and 30% for Baseline). Therefore, 0.05 mole/liter $CsPF_6$ has the better effect on suppressing the PC reduction decomposition on the graphite anode than 2 wt. % FEC.

Figure 2A:
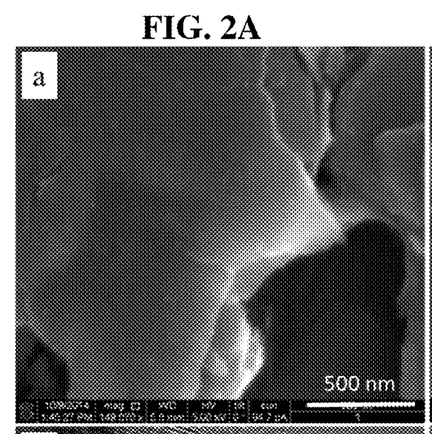
FIGS. 2A-2D are a comparison of the scanning electron microscopy (SEM) (FIGS. 2A, 2B) and the transmission electron microscopy (TEM) (FIGS. 2C, 2D) images of the surface morphologies of the graphite electrodes after the Li|graphite half-cells were charged to 0.3 V at C/20 rate in the BCs electrolyte (FIGS. 2A, 2C) and the B-FEC electrolyte (FIGS. 2B, 2D).
Figure 2B:
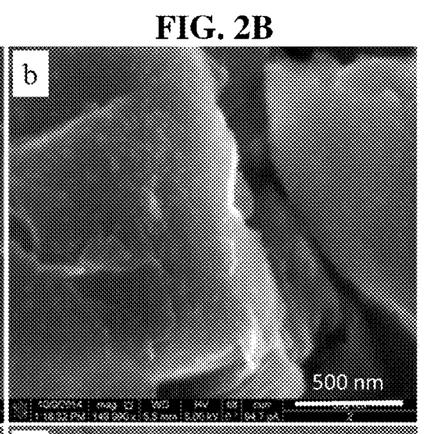
Figure 2C:
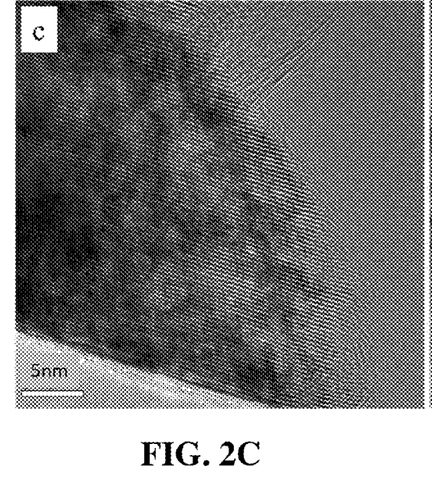
Figure 2D:
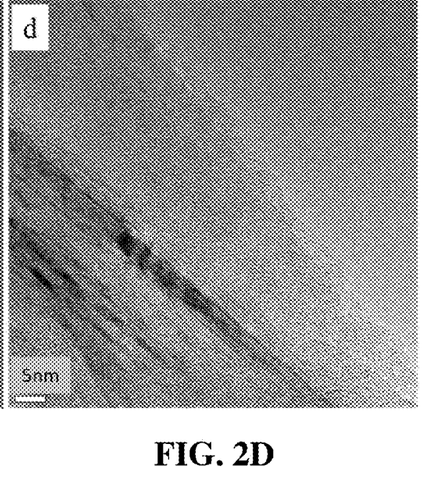

FIGS. 2A-2D compare the SEM and TEM images of the surface morphologies of the graphite electrodes after the Li|graphite half-cells were charged to 0.3 V at C/20 rate in the B-Cs electrolyte (FIGS. 2A, 2C) and the B-FEC electrolyte (FIGS. 2B, 2D). It is clearly seen from FIGS. 2A and 2C that graphite in the B-Cs electrolyte is quite clean. There is an ultrathin nm thick) and uniform SEI layer at least detected (FIG. 2C). However, the graphite in the B-FEC electrolyte have some spots on the surface of the graphite (FIG. 2B) and the clear, non-uniform SEI layer on the graphite particle has the thickness of >3 nm observed in FIG. 2D. That is, more effective $CsPF_6$ additive functions in an SEI-film-suppression mechanism.

Figure 3A:
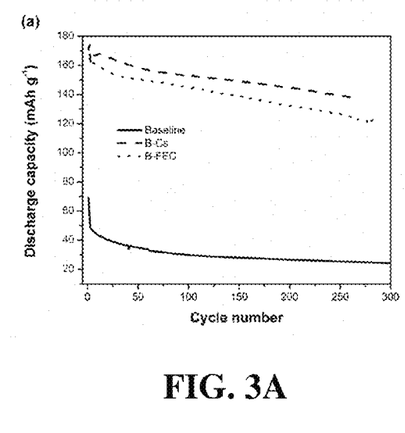
FIGS. 3A-3B show the cycling performance at room temperature (RT) and 60° C., respectively of the graphite|NCA full-cells with various electrolytes.
Figure 3B:
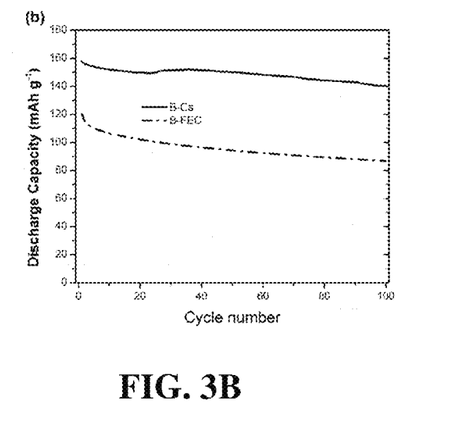
Figure 3C:
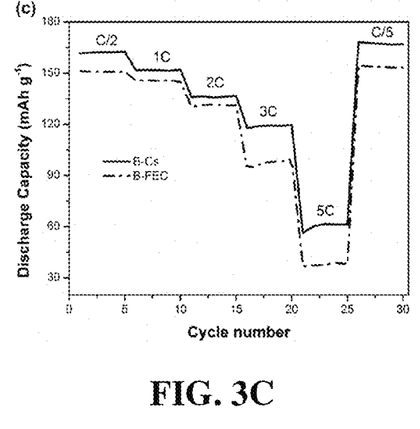
FIG. 3C shows the rate capability at RT of the graphite|NCA full-cells with various electrolytes.

FIGS. 3A-3C show the cell performance of the graphite|NCA full-cells using various electrolytes. As shown in FIG. 3A, the baseline electrolyte gives very low discharge capacity and fails to cycle well even at room temperature owing to its incompatibility with graphite anode. After $CsPF_6$ or FEC is introduced into the baseline electrolyte, the graphite|NCA full-cells with both electrolytes can be cycled stably for over 250 cycles and the B-Cs electrolyte exhibits the higher discharge capacity and better capacity retention than the B-FEC electrolyte.

Figure 3D:
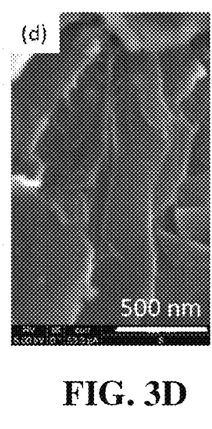
FIGS. 3D and 3E show SEM images of the surface morphologies of the graphite electrodes taken from the full-cells after 100 cycles at 60° C. using B-Cs (FIG. 3D) and B-FEC electrolytes (FIG. 3E), respectively.
Figure 3E:
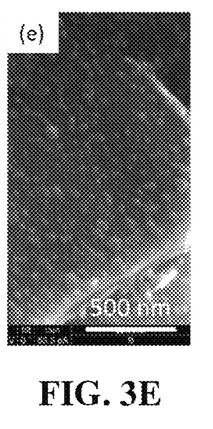

FIG. 3B shows the cycling stability of the graphite|NCA full-cells at 60° C. It is distinct that the B-Cs electrolyte has the advantages on specific capacity and capacity retention over the B-FEC electrolyte. As for the rate capability in FIG. 3C, the B-Cs electrolyte has slightly higher capacity than the B-FEC electrolyte at low current rates (≤2C), but the former is much better than the latter at high current rates (3C and 5C in this test). The SEM images (FIGS. 3D and 3E) of the cycled graphite electrodes (after 100 cycles at 60° C. from the full cells) indicate that the graphite surface cycled in the B-Cs electrolyte is still clean (FIG. 3D) but the one in the B-FEC electrolyte is covered with thick island-like SEI layer (FIG. 3E). Therefore, it is concluded that the SEI-film-suppression additive, $CsPF_6$ is the better choice than the conventional film-formation additives on enhancing the compatibility between the graphite anode and nonaqueous electrolytes.

Figure 4A:
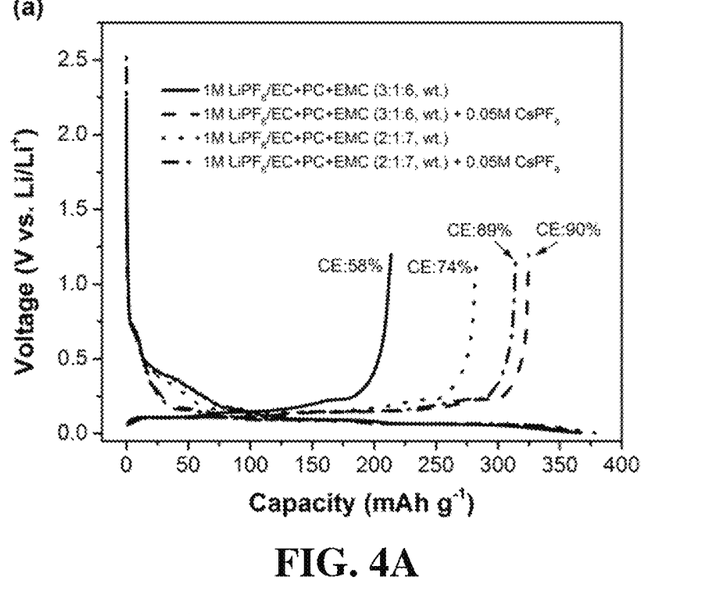
FIGS. 4A-4B show the first-cycle voltage profiles of the Li|graphite half-cells (FIG. 4A) and the graphite|NCA full-cells (FIG. 4B) with various PC-based electrolytes at room temperature. The electrolytes include 1.0 mole/liter $LiPF_6$ in EC-PC-EMC (3:1:6, wt.) without and with 0.05 mole/liter $CsPF_6$, and 1.0 mole/liter $LiPF_6$ in EC-PC-EMC (2:1:7, wt.) without and with 0.05 mole/liter $CsPF_6$.
Figure 4B:
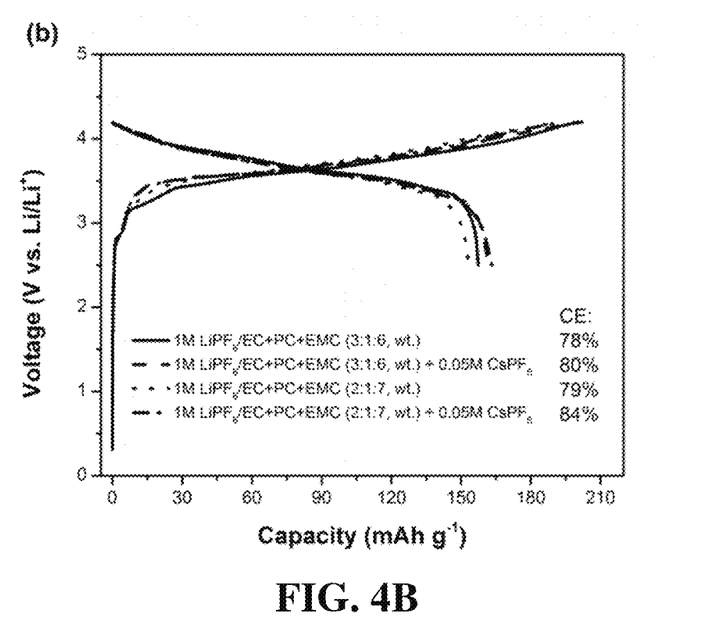

In another comparison study, two PC-based electrolytes comprising 0.05 mole/liter $CsPF_6$ (as the SEI film-suppression additive) and 1.0 mole/liter $LiPF_6$ in a solvent mixture of EC-PC-EMC at 3:1:6 by wt. and 2:1:7 by wt., respectively were prepared and used to conduct electrochemical tests. The control electrolytes of 1.0 mole/liter $LiPF_6$ in EC-PC-EMC (3:1:6, wt.) and in EC-PC-EMC (2:1:7, wt.) were also prepared and tested under the same conditions for comparison. As shown in FIG. 4A for the Li|graphite half-cells, the $CsPF_6$-containing electrolytes have significantly improved Coulombic efficiency over the related control electrolytes without $CsPF_6$ additive, 90% vs. 58% for electrolytes of 1.0 mole/liter $LiPF_6$ in EC-PC-EMC (3:1:6, wt.) with and without 0.05 mole/liter $CsPF_6$, and 89% vs. 74% for electrolytes of 1.0 mole/liter $LiPF_6$ in EC-PC-EMC (2:1:7, wt.) with and without 0.05 mole/liter $CsPF_6$. In the graphite|NCA full cells, the electrolytes with $CsPF_6$ additive also show higher Coulombic efficiency than the control electrolytes although the improvement is not as large as in the half-cells (FIG. 4B).

Figure 5A:
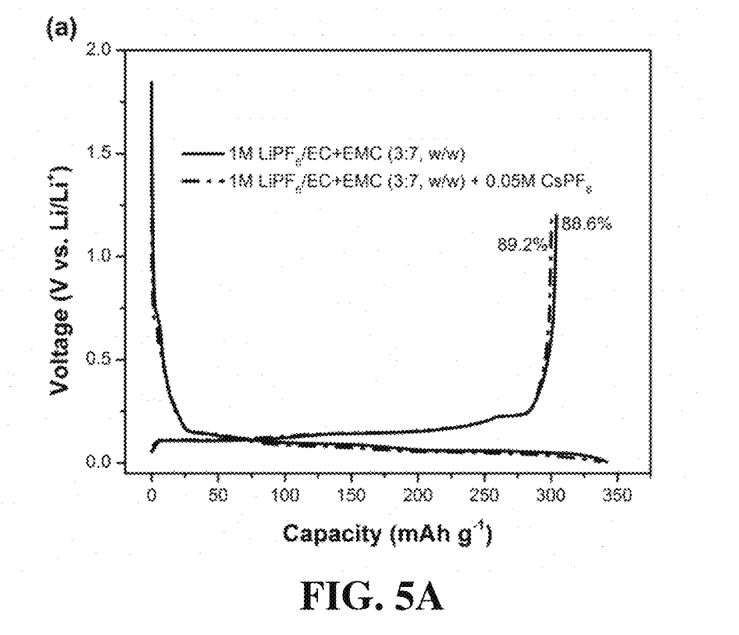
FIGS. 5A-5B show the first-cycle voltage profiles of the Li|graphite half-cells (FIG. 5A) and the graphiteiNCA full-cells (FIG. 5B) with non-PC-based electrolytes at room temperature. The electrolytes are 1.0 mole/liter $LiPF_6$ in EC-EMC (3:7, wt.) without and with 0.05 mole/liter $CsPF_6$.
Figure 5B:
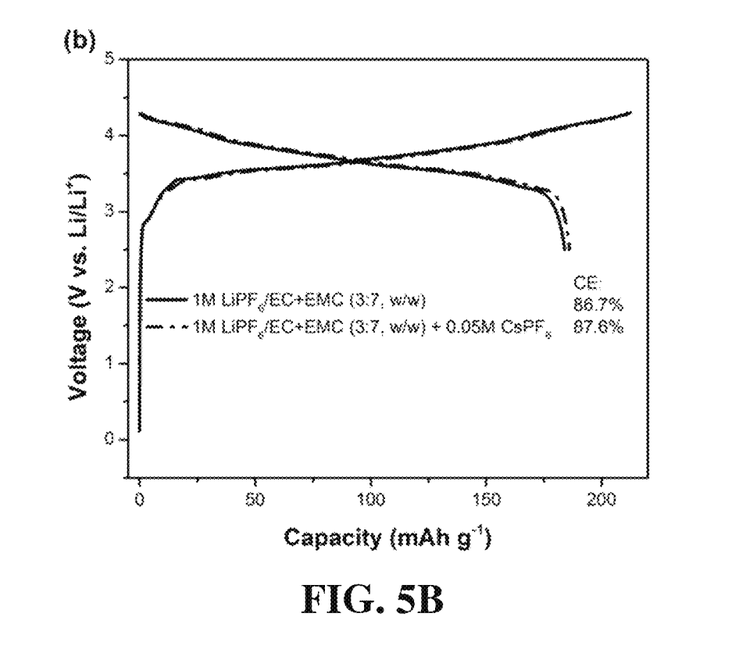

In another comparison study, two non-PC-containing electrolytes comprising 1.0 mole/liter $LiPF_6$ in a solvent mixture of EC-EMC (3:7 by wt.) with and without 0.05 mole/liter $CsPF_6$ (as the SEI film-suppression additive) were prepared and used to conduct electrochemical tests in Li|graphite half-cells (FIG. 5A) and graphite|NCA full cells (FIG. 5B). Since there is no incompatibility issue of graphite anode with PC in the electrolyte, the control electrolyte without $CsPF_6$ additive offers good first cycle Coulombic efficiencies in both half-cells and full cells. However, the addition of $CsPF_6$ still slightly improves the Coulombic efficiencies.

The above test data demonstrate that $CsPF_6$ additive is more effective to improve the compatibility of graphite anode in PC-rich electrolytes thus enhancing the battery performance.

In view of the many possible embodiments to which the principles of the disclosed devices, methods and compositions may be applied, it should be recognized that the illustrated embodiments are only preferred examples of the invention and should not be taken as limiting the scope of the invention.

What is claimed is:

1. An energy storage device comprising:
   (A) an anode comprising graphite; and
   (B) an electrolyte composition comprising:
      (i) at least one carbonate solvent;
      (ii) an additive selected from $CsPF_6$, $RbPF_6$, $Sr(PF_6)_2$, $Ba(PF_6)_2$, or a mixture thereof; and
      (iii) a lithium salt,
   wherein the concentration of additive (ii) cation is less than, or equal to, 10 weight % of that of the Li cation of the Li salt.

2. The device of claim 1, wherein the device is a lithium ion battery.

3. The device of claim 1, wherein the additive is $CsPF_6$.

4. The device of claim 1, wherein the carbonate solvent is selected from propylene carbonate, ethylene carbonate, dimethyl carbonate, ethyl methyl carbonate, diethyl carbonate, or a mixture thereof.

5. The device of claim 1, wherein the electrolyte composition further comprises a co-solvent selected from methyl butyrate, ethyl propionate, trimethyl phosphate, triethyl phosphate, tris(2,2,2-trifluoroethyl) phosphate, tributyl phosphate, trimethyl phosphite, triethyl phosphite, tris(2,2,2-trifluoroethyl) phosphite, triphenyl phosphite, dimethyl methylphosphate, or a mixture thereof.

6. The device of claim 1, wherein the carbonate solvent is selected from propylene carbonate, ethylene carbonate, or a mixture thereof.

7. The device of claim 6, wherein the electrolyte composition includes 0 to 50 weight % propylene carbonate, based on the total amount of all components of the electrolyte composition.

8. The device of claim 6, wherein the electrolyte composition includes 5 to 50 weight %, propylene carbonate and 5 to 60 weight % ethylene carbonate, based on the total amount of all the components of the electrolyte composition.

9. The device of claim 1, wherein the lithium salt is selected from $LiPF_6$, $LiBF_4$, $LiClO_4$, $LiAsF_6$, $LiSbF_6$, $LiCF_3SO_3$, $LiN(SO_2F)_2$, $LiN(SO_2CF_3)_2$, $LiN(SO_2C_2F_5)_2$, $LiN(SO_2CF_3)(SO_2C_4F_9)$, $LiC(SO_2CF_3)_3$, $LiPF_3(C_3F_7)_3$, $LiB(CF_3)_4$, $LiBF_3(C_2F_5)$, LiBOB, LiDFOB, or a mixture thereof.

10. The device of claim 1, further comprising a cathode comprising a lithium intercalation compound.

11. The device of claim 1, further comprising a cathode comprising LiMn$_2$O$_4$, LiFePO$_4$, LiCoO$_2$, LiNi$_{0.8}$Co$_{0.15}$Al$_{0.05}$O$_2$, LiNi$_{1/3}$Mn$_{1/3}$Co$_{1/3}$O$_2$, LiNi$_{0.5}$Mn$_{1.5}$O$_4$, xLi$_2$MnO$_3$.(1−x)LiNi$_{1/3}$Mn$_{1/3}$Co$_{1/3}$O$_2$, LiCoPO$_4$, or Li$_2$MsiO$_4$ (M=Fe, Mn, or Co).

12. The device of claim 1, wherein the electrolyte composition does not include 4,5-dichloroethylene carbonate, vinyl ethylene carbonate, vinylene carbonate, or fluoroethylene carbonate.

13. The device of claim 8, wherein the additive is CsPF$_6$.

14. The device of claim 2, wherein the battery has an operating temperature of −40 to +60° C.

15. An energy storage device comprising:
(A) an anode comprising graphite; and
(B) an electrolyte composition comprising:
  (i) propylene carbonate and ethylene carbonate, wherein the propylene carbonate is present in an amount of 8 to 20 weight percent based on the total amount of all the components of the electrolyte composition;
  (ii) an additive selected from CsPF$_6$, RbPF$_6$, Sr(PF$_6$)$_2$, Ba(PF$_6$)$_2$, or a mixture or combination thereof; and
  (iii) a lithium salt.

16. The energy storage device of claim 15, wherein the additive (ii) is CsPF$_6$.

17. The energy storage device of claim 1, wherein the additive is present in an amount of 0.001 to 0.2 mole/liter, and the lithium salt is present in an amount of 0.5 to 3.5 mole/liter.

18. The energy storage device of claim 15, wherein the additive is present in an amount of 0.001 to 0.2 mole/liter, and the lithium salt is present in an amount of 0.5 to 3.5 mole/liter.

19. The energy storage device of claim 1, further comprising a solid electrolyte interphase film on a surface of the anode, wherein the film has a thickness of less than 3 nm.

20. The energy storage device of claim 15, further comprising a solid electrolyte interphase film on a surface of the anode, wherein the film has a thickness of less than 3 nm.

21. The energy storage device of claim 15, wherein the ethylene carbonate is present in an amount of 5 to 60 weight percent based on the total amount of all the components of the electrolyte composition.

22. The energy storage device of claim 15, wherein the electrolyte composition further comprises ethyl methyl carbonate.

23. The energy storage device of claim 15, wherein the device is a lithium ion battery.

24. The energy storage device of claim 15, wherein the lithium salt is selected from LiPF$_6$, LiBF$_4$, LiClO$_4$, LiAsF$_6$, LiSbF$_6$, LiCF$_3$SO$_3$, LiN(SO$_2$F)$_2$, LiN(SO$_2$CF$_3$)$_2$, LiN(SO$_2$C$_2$F$_5$)$_2$, LiN(SO$_2$CF$_3$)(SO$_2$C$_4$F$_9$), LiC(SO$_2$CF$_3$)$_3$, LiPF$_3$(C$_3$F$_7$)$_3$, LiB(CF$_3$)$_4$, LiBF$_3$(C$_2$F$_5$), LiBOB, LiDFOB, or a mixture thereof.

25. The energy storage device of claim 15, further comprising a cathode comprising a lithium intercalation compound.

26. The energy storage device of claim 15, further comprising a cathode comprising LiMn$_2$O$_4$, LiFePO$_4$, LiCoO$_2$, LiNi$_{0.8}$Co$_{0.15}$Al$_{0.05}$O$_2$, LiNi$_{1/3}$Mn$_{1/3}$Co$_{1/3}$O$_2$, LiNi$_{0.5}$Mn$_{1.5}$O$_4$, xLi$_2$MnO$_3$.(1−x)LiNi$_{1/3}$Mn$_{1/3}$Co$_{1/3}$O$_2$, LiCoPO$_4$, or Li$_2$MsiO$_4$ (M=Fe, Mn, or Co).

27. The energy storage device of claim 15, wherein the concentration of additive (ii) cation is less than, or equal to, 10 weight % of that of the Li salt cation.

28. The energy device of claim 15, wherein the electrolyte composition does not include 4,5-dichloroethylene carbonate, vinyl ethylene carbonate, vinylene carbonate, or fluoroethylene carbonate.

29. The energy storage device of claim 22, wherein the additive (ii) is CsPF$_6$.

30. The energy storage device of claim 21, wherein the electrolyte composition further comprises ethyl methyl carbonate.

31. The energy storage device of claim 30, wherein the additive (ii) is CsPF$_6$.

* * * * *